United States Patent
Ide et al.

(10) Patent No.: US 11,374,248 B2
(45) Date of Patent: Jun. 28, 2022

(54) ORIENTED APATITE TYPE OXIDE ION CONDUCTOR AND METHOD FOR PRODUCING SAME

(71) Applicant: MITSUI MINING & SMELTING CO., LTD., Tokyo (JP)

(72) Inventors: Shingo Ide, Ageo (JP); Yusuke Shiro, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 15 days.

(21) Appl. No.: 16/960,711

(22) PCT Filed: Feb. 14, 2019

(86) PCT No.: PCT/JP2019/005289
§ 371 (c)(1),
(2) Date: Jul. 8, 2020

(87) PCT Pub. No.: WO2019/160018
PCT Pub. Date: Aug. 22, 2019

(65) Prior Publication Data
US 2020/0381760 A1 Dec. 3, 2020

(30) Foreign Application Priority Data
Feb. 14, 2018 (JP) .............................. JP2018-024559

(51) Int. Cl.
*H01M 8/00* (2016.01)
*H01M 8/1246* (2016.01)
*H01M 8/12* (2016.01)

(52) U.S. Cl.
CPC .. *H01M 8/1246* (2013.01); *H01M 2008/1293* (2013.01); *H01M 2300/0074* (2013.01)

(58) Field of Classification Search
CPC ........... H01M 2300/0074; H01M 8/123; C01F 17/32; C01G 17/006; C01G 9/006
See application file for complete search history.

(56) References Cited

U.S. PATENT DOCUMENTS

2018/0183068 A1   6/2018   Ide et al.
2018/0186704 A1   7/2018   Ide et al.

FOREIGN PATENT DOCUMENTS

| CN | 107078316 A | 8/2017 |
|---|---|---|
| EP | 3244474 A1 | 11/2017 |
| JP | 2004-327210 A | 11/2004 |
| JP | 2005-126269 A | 5/2005 |
| JP | 2015-185321 A | 10/2015 |
| JP | 2016-222506 A | 12/2016 |
| TW | 201634765 A | 10/2016 |
| WO | 2016/111110 A1 | 7/2016 |
| WO | 2017/018149 A1 | 2/2017 |

OTHER PUBLICATIONS

Najib et al., Doping Strategies to Optimize the Oxide Ion Conductivity in Apatite-type Ionic Conductors, 2004, Dalton Transactions, 0 , 3106-3109 Feb. 2004, (Year: 2004).*
Sansom et al. "A Comparison of the effect of the Rare Earth vs. Si Site Doping on the Conductivities of Apatite-type Rare Earth Silicates", 2006, Journal of Solid State Electrochemsitry, 10, 562-568,Jan. 2006, (Year: 2006).*
Fukuda et al. "Oxide-Ion Conductivity of Highly c-Axis-Oriented Apatite-Type Lanthanum Silicate Polycrystal Formed by Reactive Diffusion between La2SiO5 and La2Si2O7", 2012, Chemistry of Materials, 23, 5474-5483, Jun. 2012, (Year: 2012).*
International Search Report, dated Apr. 9, 2019, from corresponding PCT application No. PCT/JP2019/005289.

* cited by examiner

*Primary Examiner* — Cynthia H Kelly
*Assistant Examiner* — Monique M Wills
(74) *Attorney, Agent, or Firm* — Nixon & Vanderhye

(57) ABSTRACT

An oriented apatite-type oxide ion conductor includes a composite oxide expressed as $A_{9.33+x}[T_{6.00-y}M_y]O_{26.0+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, and M represents one or two or more elements selected from the group consisting of B, Ge, Zn, Sn, W, and Mo, and where x is from −1.00 to 1.00, y is from 0.40 to less than 1.00, and z is from −3.00 to 2.00.

5 Claims, No Drawings

ORIENTED APATITE TYPE OXIDE ION CONDUCTOR AND METHOD FOR PRODUCING SAME

TECHNICAL FIELD

The present invention relates to an oriented apatite-type oxide ion conductor that can be used as a solid electrolyte for various batteries such as a solid electrolyte fuel cell (SOFC), an ion battery, and an air cell, as well as in a sensor, a catalyst, a separation membrane, and the like, and a method for producing the oriented apatite-type oxide ion conductor.

BACKGROUND ART

The applicant of the present invention has previously proposed an oriented apatite-type oxide ion conductor expressed as $A_{9.33+x}[T_{6-y}M_y]O_{26.00+z}$ (see Patent Literature 1). In the formula, A represents an element such as La. T represents an element such as Si. M represents an element such as B. This oxide ion conductor can be obtained by heating a precursor expressed as $A_{2+x}TO_{5+z}$ in a gas phase containing an element M for a reaction of the precursor with the element M. The amount of an element M that is needed in order to obtain the above-described oxide ion conductor having an apatite-type crystal structure with use of this method depends on the composition of the above-described precursor, and it is necessary that y is 1.00 or greater.

CITATION LIST

Patent Literature

Patent Literature 1: U.S. Patent Application Publication No. 2018/0183068

SUMMARY OF INVENTION

The oxide ion conductor expressed as the formula above has excellent oxide ion conductivity. Oxide ion conductors are widely used in solid electrolytes of various batteries such as solid electrolyte fuel cells, ion batteries, and air cells, as well as oxygen sensors, catalysts, separation membranes, and the like, and there is demand for further improvement in oxide ion conductivity. Therefore, an object of the present invention is to achieve a further improvement in the conductivity of a conventionally known oriented apatite-type oxide ion conductor.

To address the above-described object, the inventors of the present invention conducted in-depth research, and found that oxide ion conductivity can be improved further by controlling the composition of elements constituting an oriented apatite-type oxide ion conductor.

The present invention was made based on the above-described findings, and addresses the above-described object by providing an oriented apatite-type oxide ion conductor including a composite oxide expressed as $A_{9.33+x}[T_{6.00-y}M_y]O_{26.0+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, and M represents one or two or more elements selected from the group consisting of B, Ge, Zn, Sn, W, and Mo, and where x is from −1.00 to 1.00, y is from 0.40 to less than 1.00, and z is from −3.00 to 2.00.

Also, the present invention provides a method for producing an oriented apatite-type oxide ion conductor, the method including a step of converting a precursor expressed as $A_{2.00+x}TO_{5.00+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, x is from −1.00 to 1.00, and z is from −2.00 to 2.00, into an oriented apatite-type crystal structure by heating the precursor in a gas phase containing an element M, where M represents one or two or more elements selected from the group consisting of B, Ge, Zn, Sn, W, and Mo, and thereby reacting the element M with the precursor; and an annealing step.

DESCRIPTION OF EMBODIMENTS

Hereinafter, the present invention will be described based on preferred embodiments thereof. The inventors of the present invention conducted further research on the oxide ion conductor disclosed in Patent Literature 1 above, and found that a decrease in conductivity was observed when an excessive amount of an element M was introduced into the oxide ion conductor. Accordingly, from the viewpoint of suppressing a decrease in conductivity, it is advantageous to prevent the introduction of an excessive amount of an element M. Control of the composition of the oxide ion conductor has not been easy so far, but as a result of in-depth research, the inventors of the present invention found a method with which an oriented apatite-type oxide ion conductor in which the amount of an element M introduced is small can be produced. This oxide ion conductor will be described in detail below.

Oriented Apatite-Type Oxide Ion Conductor

An oriented apatite-type oxide ion conductor (hereinafter also referred to as the "present oxide ion conductor") according to an example of the present embodiment includes a composite oxide (hereinafter also referred to as the "present apatite-type composite oxide") that has an apatite-type crystal structure and is expressed as a formula (1): $A_{9.33+x}[T_{6.00-y}M_y]O_{26.0+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, and M represents one or two or more elements selected from the group consisting of B, Ge, Zn, Sn, W, and Mo, and where x is from −1.00 to 1.00, y is from 0.40 to less than 1.00, and z is from −3.00 to 2.00.

In the present specification, the term "oriented" of an oriented apatite-type oxide ion conductor means that the apatite-type oxide ion conductor, which is a polycrystal, has an axis of orientation with which crystal axes are aligned, and includes uniaxial orientation and biaxial orientation. It is preferable that the present apatite-type composite oxide has c-axis orientation.

In the formula (1), La, Ce, Pr, Nd, Sm, Eu, Gd, Tb, Dy, Be, Mg, Ca, Sr, and Ba, which are represented by A, are the elements that share a common feature of being lanthanoids or alkaline earth metals that can produce positively charged ions and constitute an apatite-type hexagonal crystal structure. Among these elements, one element, or a combination of two or more elements, selected from the group consisting of La, Nd, Ba, Sr, Ca, and Ce is preferable because such elements and combinations can improve the oxide ion conductivity even more, and one of La and Nd or a combination of La and one or two or more elements selected from the group consisting of Nd, Ba, Sr, Ca, and Ce is particularly preferable. Moreover, it is sufficient that T in the formula (1) represents an element including Si or Ge or both.

The element M in the formula (1) is introduced through a reaction with a metastable precursor ($A_{2.00+x}TO_{5.00+z}$, which will be described later) in a gas phase, and can thereby convert crystals of the precursor into an apatite-type crystal structure and orient the crystals in one direction. From this viewpoint, the element M may be any element that changes to the gas phase at a temperature of 1000° C. or higher at which the precursor will be converted into an apatite-type crystal structure and can achieve a required vapor pressure. Note that the "required vapor pressure" means a vapor pressure at which the element M can move in an atmosphere in a gas-phase state and can advance the reaction by propagating from the surface to the inside of the precursor through intergranular or transgranular diffusion.

Thus, from this viewpoint, the element M may be one or two or more elements selected from the group consisting of B, Ge, Zn, W, Sn, and Mo, for example. Among these elements, B, Ge, Zn, and the like are particularly preferable in terms of the high degrees of orientation and high productivity (orientation speed).

In the formula (1), $A_{9.33+x}[T_{6.00-y}M_y]O_{26.0+z}$, from the viewpoint of enabling the degree of orientation and the oxide ion conductivity to be improved, x is preferably from −1.00 to 1.00, particularly preferably 0.00 or greater or 0.70 or less, more particularly preferably 0.45 or greater or 0.65 or less. In the formula (1), from the viewpoints of filling the position of the element T in the apatite-type crystal lattice and improving the conductivity of the present oxide ion conductor to be obtained, y is preferably 0.40 or greater and less than 1.00, particularly preferably 0.40 or greater and 0.90 or less, more particularly preferably 0.40 or greater or 0.80 or less, even more particularly preferably 0.40 or greater or 0.70 or less, and yet even more particularly preferably 0.50 or greater and 0.70 or less. In the formula (1), from the viewpoint of keeping the electroneutrality in the apatite-type crystal lattice, z is preferably from −3.00 to 2.00, particularly preferably −2.00 or greater or 1.50 or less, and more particularly preferably −1.00 or greater or 1.00 or less.

Moreover, in the formula (1), the ratio (A/M) of the number of moles of A to the number of moles of M, or in other words, (9.33+x)/y in the formula (1) is preferably 10.0 to 26.0, particularly preferably greater than 10.0 or 26.0 or less, more particularly preferably 11.0 or greater or 26.0 or less, and even more particularly preferably 12.0 or greater or 26.0 or less, from the viewpoint of keeping the spatial occupation ratio in the apatite-type crystal lattice.

Specific examples of the composite oxide expressed as the formula (1), $A_{9.33+x}[T_{6.00-y}M_y]O_{26.0+z}$, include, but are not limited to, $La_{9.33+x}Si_{5.2}Zn_{0.80}O_{26.0+z}$, $La_{9.33+x}Ge_{5.09}B_{0.91}O_{26.0+z}$, $Nd_{9.33+x}Si_{5.15}B_{0.85}O_{26.0+z}$, and the like.

The present apatite-type composite oxide can be made to have a degree of orientation as measured according to the Lotgering method, that is, a Lotgering degree of orientation of 0.60 or greater, specifically 0.80 or greater, more specifically 0.90 or greater, and even more specifically 0.97 or greater.

In order for the present apatite-type composite oxide to have a Lotgering degree of orientation of 0.60 or greater, it is preferable to prepare a single-phase, high-density (having a relative density of 80% or higher) precursor expressed as $A_{2.00+x}TO_{5.00+z}$. However, the present invention is not limited to this method.

The present apatite-type composite oxide can be made to have an oxide ion conductivity of $10^{-4}$ S/cm or greater, specifically $10^{-3}$ S/cm or greater, and more specifically $10^{-2}$ S/cm or greater, at 500° C. In order for the present apatite-type composite oxide to have an oxide ion conductivity of $10^{-4}$ S/cm or greater at 500° C., it is preferable to set the Lotgering degree of orientation to be 0.60 or greater. However, the present invention is not limited to this method.

The present apatite-type composite oxide can be made to have a transference number of 0.8 or greater, specifically 0.9 or greater, and more specifically 0.95 or greater. In order for the present apatite-type composite oxide to have a transference number of 0.8 or greater, it is preferable to set the purity of $A_{9.33+x}[T_{6.00-y}M_y]O_{26.0+z}$ to be 90 mass % or greater. However, the present invention is not limited to this method.

Method for Producing Oxide Ion Conductor

A method (hereinafter also referred to as the "present production method") for producing an oxide ion conductor according to an example of the present embodiment includes a step (hereinafter also referred to as the "gas phase-solid phase diffusion step") of converting a precursor expressed as a formula (2): $A_{2.00+x}TO_{5.00+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, x is from −1.00 to 1.00, and z is from −2.00 to 2.00, into an oriented apatite-type crystal structure by heating the precursor in a gas phase containing an element M, where M represents one or two or more elements selected from the group consisting of B, Ge, Zn, Sn, W, and Mo, and thereby reacting the element M with the precursor; and a step (hereinafter also referred to as the "annealing step") of performing annealing. It is sufficient that the present production method includes the gas phase-solid phase diffusion step and the annealing step, and other steps may optionally be added thereto.

With the present production method, the occurrence of a crack and the like in the crystals can be suppressed. Thus, not only an oriented apatite-type oxide ion conductor having a larger area can be produced, but also an oxide ion conductor having an apatite-type crystal structure in which crystals are highly oriented in one direction can be obtained. As a result, an oriented apatite-type composite oxide having a higher oxide ion conductivity can be obtained.

The element M (cations) in the gas phase reacts with the precursor from the surface of the precursor, thereby starting to form an oriented apatite-type composite oxide. Then, the reaction at the interface between the precursor and the generated apatite phase proceeds, and thus, the entire precursor can be converted into the oriented apatite-type composite oxide. In particular, if the oriented apatite-type composite oxide obtained through the gas phase-solid phase diffusion step is heated in a gas phase containing no element M in the annealing step, which is performed after the gas phase-solid phase diffusion step, the element M will be re-vaporized, and thus, the amount of the element M contained in the oriented apatite-type composite oxide to be obtained can be reduced, and also the degree of orientation can be increased due to the crystals being rearranged. Therefore, the present oxide ion conductor can be produced using the present production method. It should be noted however that the oxide ion conductor that can be produced using the present production method is not limited to the present oxide ion conductor described above.

Precursor

The precursor of the present production method may be any compound that is expressed as the formula (2) above, and may be non-oriented.

The precursor may be a sintered disk, a shaped body, or a film, for example.

The precursor may be, for example, a compound obtained through wet synthesis, such as a sol-gel process or hydrothermal synthesis, in which a compound containing the elements A and T to be obtained is used as the raw material, may be a compound obtained by sintering a compound containing the elements A and T, or may be a film formed through sputtering or the like.

Among these, the sintered disk of the precursor may be prepared as a composite oxide sintered disk obtained by mixing and heating two or more oxides using a solid-phase method, a green compact obtained by press forming a powder obtained by grinding the sintered disk, or furthermore, a sintered disk (referred to as the "composite oxide green compact sintered disk") obtained by heating and sintering the green compact. Out of these prepared forms, in terms of the density of the final oriented apatite-type oxide ion conductor, a composite oxide green compact sintered disk is preferable; more particularly, a green compact sintered disk obtained by heating and sintering a green compact obtained through press forming using cold isostatic pressing (CIP) is more preferable, and the green compact sintered disk whose surface has been polished is even more preferable. Note that, regarding the method for preparing the precursor, it is preferable to perform sintering through heating at from 1100° C. to 1700° C. in the air, and more specifically, it is more preferable to perform sintering by heating a mixture of a compound containing A and T, which serves as the raw material, at from 1200° C. to 1700° C. in the air and again heating the mixture as a green compact at from 1300° C. to 1700° C. in the air. In the case where firing is performed twice as described above, the first firing step has the function of mainly synthesizing a composite oxide, and the second firing step has the function of mainly sintering the composite oxide.

The amount of an element M that can be doped from the gas phase is determined by the composition ratio of the precursor. Accordingly, the amount of an element M in an apatite-type silicate, germanate, or silicogermanate that is produced using a gas-phase method, that is, the present apatite-type composite oxide depends on the composition ratio of the precursor.

From this viewpoint, x in the formula (2) is preferably from −1.00 to 1.00, particularly preferably from −0.40 or greater and 0.70 or less, and more particularly preferably 0.00 or greater or 0.60 or less.

In the formula (2), from the viewpoint of allowing the electroneutrality in the precursor crystal lattice to be kept and the crystal structure to be chemically kept, z is preferably −2.00 to 2.00, particularly preferably −0.60 or greater or 1.00 or less, and more particularly preferably 0.00 or greater or 0.70 or less.

Specific composition examples of the precursor include, but are not limited to, $La_2SiO_5$, $Nd_2SiO_5$, $LaNdSiO_5$, $La_2GeO_5$, and the like.

Gas Phase-Solid Phase Diffusion Step

A feature of the gas phase-solid phase diffusion step of the present production method is that oriented crystals grow from the gas phase-solid phase interface. The element M is introduced from the gas phase, and thus an oriented sintered disk having a desired composition can be obtained. At this time, while the element M in the gas phase is propagating into the crystals via the surface of the precursor, the crystals become oriented. Therefore, the orientation direction can be controlled by masking a portion of the surface of the above-described precursor green compact sintered disk.

The element M may be any element that changes to the gas phase at a temperature of 1000° C. or higher at which the precursor will be converted into an apatite-type crystal structure and can achieve a required vapor pressure. In this context, the "required vapor pressure" means a vapor pressure at which the element M can move in an atmosphere in a gas-phase state and can advance the reaction by propagating from the surface to the inside of the precursor through intragranular or transgranular diffusion. From this viewpoint, the element M may be one or two or more elements selected from the group consisting of B, Ge, Zn, W, Sn, and Mo. These elements allow an oriented apatite-type crystal structure sintered disk to be obtained in which the element M is introduced in the T site due to the reaction of the element M in the gas phase with the surface of the precursor. For example, in the case where the element M is B, $B_2O_3$, $H_3BO_3$, $LaBO_3$, $LaB_6$, or the like can be used as the compound containing the element M. An amorphous compound such as borosilicate glass can also be used. On the other hand, in the case where the element M is Zn, ZnO, a Zn metal, $Zn_2SiO_4$, or the like can be used; in the case of Ge, $GeO_2$, a Ge metal, or the like can be used; in the case of W, $WO_3$, $WO_2$, a W metal, or the like can be used; in the case of Sn, $SnO_2$, SnO, a Sn metal, or the like can be used; and in the case of Mo, $MoO_2$, $MoO_3$, $MoSi_2$, a Mo metal, or the like can be used.

It is sufficient that the gas phase containing the element M contains any of the followings: ions containing the element M, a vapor containing the element M, a gas containing the element M, and the like. For example, the gas phase containing the element M may be a gas phase containing a vapor containing the element M as well as oxygen. Accordingly, the heating atmosphere in this case, that is, the atmosphere within a vessel that contains the element M may be any of an atmosphere of air, an oxidizing atmosphere, a reducing atmosphere, and an inert atmosphere, and furthermore, these atmospheres may be in a pressurized state or a vacuum state.

As a specific method for heating the precursor in the gas phase containing the element M in the gas phase-solid phase diffusion step, the following method, for example, can be used: the precursor expressed as $A_{2.00+x}TO_{5.00+z}$ and the compound containing the element M are placed into a vessel, for example, a hermetically sealed vessel or a vessel with a lid, and heated to vaporize the compound containing the element M, thereby changing the atmosphere within the vessel to an atmosphere of a gas phase containing the element M, and the element M and the surface of the precursor are thus allowed to react with each other. However, the method for heating the precursor is not limited to this method. Note that the "vessel" as used in the gas phase-solid phase diffusion step means an object that defines a space that is needed in order to achieve the above-described "required vapor pressure", and examples thereof include, but are not limited to, a reaction tube, a chamber, a saggar with a lid, and the like.

More specifically, a sintered disk having a composition of $La_2SiO_5$ and a $B_2O_3$ powder are placed into the same alumina vessel with a lid and heated at from 1200 to 1600° C. to vaporize the $B_2O_3$ powder, thereby changing the atmosphere within the vessel to an atmosphere of a gas phase containing B element, and thus, a c-axis oriented apatite $La_{9.33+x}(Si_{4.7}B_{1.3})O_{26.0+z}$ in which the Si site is substituted with B can be synthesized.

The heating temperature (the set temperature of a furnace) in the gas phase-solid phase diffusion step is preferably 1000° C. or higher, particularly preferably 1100° C. or higher, and more particularly preferably 1200° C. or higher. The upper limit of the heating temperature is not limited to a specific value, but it is understood that, under the atmospheric pressure, a temperature near 1700° C. at which the crystal structure of the apatite-type composite oxide can be maintained is the upper limit temperature.

Annealing Step

In the present step, the oriented apatite-type composite oxide that has been obtained through the gas phase-solid phase diffusion step is further heated. Preferably, the oriented apatite-type composite oxide is heated in an atmosphere of a gas phase containing no element M. In this manner, the element M contained in the crystal structure of the oriented apatite-type composite oxide obtained through the gas phase-solid phase diffusion step can be removed, and the amount thereof can be reduced. In the annealing step, the oriented apatite-type composite oxide obtained through the gas phase-solid phase diffusion step is taken out and can be heated in a vessel that contains no gas containing an element M and no compound containing an element M. In the case where the element M is supplied by a gas flow in the gas phase-solid phase diffusion step, it is also possible to perform the annealing step immediately after the gas phase-solid phase diffusion step by stopping the gas flow. The annealing atmosphere may be any of an atmosphere of air, an oxidizing atmosphere, a reducing atmosphere, and an inert atmosphere, and these atmospheres may be in a pressurized state or a vacuum state.

Specifically, a c-axis oriented apatite $A_{9.33+x}[T_{6.00-y}M_y]O_{26.0+z}$ in which the substitution amount y of B is preferably less than 1.00 and more preferably 0.90 or less can be produced by heating the oriented apatite-type composite oxide at a temperature of 1000° C. to 1600° C. in the air.

The temperature at which the oriented apatite-type composite oxide is heated in the annealing step is preferably 1000° C. or higher, particularly preferably 1100° C. or higher, and more particularly preferably 1200° C. or higher. The upper limit of the heating temperature is not limited to a specific value, and a temperature near 1700° C. at which the crystal structure of the apatite-type composite oxide can be maintained is the upper limit temperature under the atmospheric pressure. Provided that the annealing temperature is within this range, the annealing time can be set to be preferably 0.5 hours or longer or 3.0 hours or shorter, and more preferably 1.0 hour or longer or 2.0 hours or shorter.

In the annealing step, the element M contained in the crystal structure of the oriented apatite-type composite oxide is vaporized and removed from the oriented apatite-type composite oxide by heating the oriented apatite-type composite oxide at a temperature of preferably 1000° C. or higher as described above. Therefore, it is preferable that the vessel that is used in the annealing step is an open type non-hermetically-sealed vessel. In the case where a hermetically sealed vessel is used, it is preferable to perform heating while flowing an oxygen-containing gas within the vessel and thereby remove the element M in the gas phase.

Uses

An example of the form of usage of the present oxide ion conductor is the use of the present oxide ion conductor as a solid electrolyte of an electrode assembly that has a configuration in which electrodes are stacked on two surfaces of the present oxide ion conductor. There is no limitation on the shape of the present oxide ion conductor. The present oxide ion conductor may be flat film-shaped for example, and also a form in which the present oxide ion conductor is cylindrical or other forms are conceivable. For example, in the case where the present oxide ion conductor has a cylindrical shape, electrodes are usually stacked on an inner circumferential surface and an outer circumferential surface thereof.

In the case where an electrode assembly in which the present oxide ion conductor is used, such as the one described above, is used as a cell of a fuel cell (SOFC), when, for example, a fuel gas is supplied to an anode of the electrode assembly, an oxidizing agent (air, oxygen, or the like) is supplied to a cathode, and the operation is started at from 350 to 1000° C., oxygen molecules receiving electrons at the cathode become $O^{2-}$ ions, which then reach the anode through the solid electrolyte, and bind to hydrogen and release electrons at the anode, and thus, electricity can be generated.

On the other hand, in the case where an electrode assembly in which the present oxide ion conductor is used, such as the one described above, is used as an oxygen sensor, when, for example, one side of the electrode assembly is exposed to a reference gas, and the opposite side is exposed to an atmosphere to be measured, an electromotive force is generated in accordance with the oxygen concentration in the atmosphere being measured. Therefore, when, for example, the reference gas is atmospheric air, and the atmosphere being measured is an exhaust gas emitted from an internal combustion engine, the oxygen sensor can be used to control the air-fuel ratio of the exhaust gas.

Moreover, in the case where an electrode assembly in which the present oxide ion conductor is used, such as the one described above, is used as an oxygen separation membrane, as in the case where the electrode assembly is used as a cell of a fuel cell (SOFC), when air is supplied to the cathode, and the operation is started at from 350 to 1000° C., oxygen molecules receiving electrons at the cathode become $O^{2-}$ ions, which reach the anode through the solid electrolyte and release electrons at the anode, and the $O^{2-}$ ions thereby bind to each other, and thus, only oxygen molecules can permeate through the oxygen separation membrane.

Moreover, in the case where an electrode assembly in which the present oxide ion conductor is used, such as the one described above, is used as a limiting current oxygen sensor, it is possible to use the electrode assembly as an oxygen sensor by measuring the current value between the two electrodes, which is obtained in accordance with the oxygen concentration on the cathode side.

In these uses, from the viewpoint of suppressing electric resistance and ensuring production stability, the thickness of the present oxide ion conductor is preferably 0.01 to 1000 μm, and more particularly, the thickness is more preferably 0.1 μm or greater or 500 μm or less. Note that it is preferable that the electrodes used in the above-described uses are in a porous form. Materials that are known for these uses can be appropriately used as the materials of the electrodes, and the thickness thereof is preferably about 0.01 to 70 μm.

Description of Phrases

The meaning of the phrase "X to Y" (X and Y are arbitrary numbers) as used herein includes not only "X or greater and Y or less" but also "preferably greater than X" or "preferably smaller than Y", unless otherwise specified. Moreover, the meaning of the phrase "X or greater" (X is an arbitrary number) or "Y or less" (Y is an arbitrary number) also includes an intention to the effect that "greater than X is preferable" or "less than Y is preferable".

EXAMPLES

Hereinafter, the present invention will be described in greater detail based on examples and a comparative example below.

Example 1

(1) Gas Phase-Solid Phase Diffusion Step $La_2O_3$ and $SiO_2$ were blended in a molar ratio of 1:1. Then, ethanol was added thereto, followed by mixing using a ball mill. After that, the mixture was dried, ground in a mortar, and fired at 1650° C. under an atmosphere of air for 3 hours using a Pt crucible. Subsequently, ethanol was added to the fired product, which was then ground using a planetary ball mill, to obtain a powder of a pre-fired body.

Next, the powder of the pre-fired body was placed into a mold having a diameter of 20 mm and uniaxially molded by applying a pressure thereto from one direction, then, cold isostatic pressing (CIP) was further performed at 600 MPa for 1 minute, and thus, a pellet was formed. Subsequently, this pellet-shaped compact was heated at 1600° C. in the air for 3 hours to obtain a pellet-shaped sintered disk. The surface of the obtained pellet-shaped sintered disk was polished using a diamond whetstone, and thus, a precursor was obtained.

Based on the results of powder X-ray diffractometry and chemical analysis of the thus obtained precursor, the precursor was confirmed to have a structure of $La_2SiO_5$.

800 mg of the obtained precursor (pellet) and 140 mg of a $B_2O_3$ powder were placed into a saggar with a lid, and heated, with use of an electric furnace, at 1550° C. (temperature of the atmosphere within the furnace) in the air for 50 hours, to thereby generate $B_2O_3$ vapor in the saggar and react the $B_2O_3$ vapor with the precursor. The surface of the thus obtained pellet was polished using waterproof abrasive paper with a grit size of 1200, and thus, a sintered disk of an oriented apatite-type composite oxide was obtained.

(2) Annealing Step

Next, the polished oriented apatite-type composite oxide was heated at 1600° C. in the air for 1 hour using an electric furnace to obtain a sample. $B_2O_3$ was not contained in the air.

Example 2

A sample was obtained in a similar manner to that of Example 1, except that, in the annealing step of Example 1, the oriented apatite-type composite oxide was heated at 1500° C. in the air for 2 hours using an electric furnace.

Example 3

A sample was obtained in a similar manner to that of Example 1, except that, in the annealing step of Example 1, the oriented apatite-type composite oxide was heated at 1500° C. in the air for 1 hour using an electric furnace.

Example 4

A sample was obtained in a similar manner to that of Example 1 except that, in the annealing step of Example 1, the oriented apatite-type composite oxide was heated at 1400° C. in the air for 1 hour using an electric furnace.

The apatite-type sintered disks (samples) obtained in Examples 1 to 4 were analyzed through powder X-ray diffractometry and chemical analysis, and it was confirmed that the main constituent phases of the apatite-type sintered disks (samples) of all of the examples had an apatite-type crystal structure with the space group belonging to $P6_3/m$, and the apatite-type sintered disks (samples) had the compositions shown in Table 1 below. Moreover, the apatite-type sintered disks (samples) of all of the examples were examined under a polarizing microscope and a scanning electron microscope, and no cracks were observed.

Note that, even when an element such as Ce, Pr, Sm, Eu, Gd, Tb, Dy, Be, Mg, Ca, Sr, or Ba is used instead of La in Examples 1 to 4, the apatite-type crystal structure is stable in a high-temperature region, so that it is possible to produce a similar apatite-type sintered disk to that which is produced when La is used, and it can be expected that similar effects to those of the examples can be obtained.

Comparative Example 1

An oriented apatite-type composite oxide (sample) was obtained in a similar manner to that of Example 1, except that the annealing step of Example 1 was not performed.

Method for Measuring Degree of Orientation

The degree of orientation was calculated according to the Lotgering method using formulae below. The degree of orientation f was calculated from the formula (A) below using the ratio ρ between the sum total of all peak intensities obtained through bulk X-ray diffractometry of the apatite-type sintered disk and the sum of two peak intensities attributed to (002) and (004).

$$f=(\rho-\rho_0)/(1-\rho_0) \quad (A)$$

where $\rho_0$: theoretical value of apatite-type crystal structure $\rho_0=\Sigma I_0(001)/\Sigma I_0(hkl)$ ρ: measured value for oriented apatite sintered disk $\rho=\Sigma I(001)/\Sigma I(hkl)$

Measurement of Oxide Ion Conductivity

Platinum films having a thickness of 150 nm were formed on two surfaces of each apatite-type sintered disk (sample) through sputtering, to form electrodes on the two surfaces. After that, complex impedance analysis was performed at a frequency of 0.1 Hz to 32 MHz using an impedance measurement device by changing the temperature in a heating furnace. For each of the apatite-type sintered disks (samples), the oxide ion conductivity (S/cm) was obtained from the total resistance component (transgranular resistance+intergranular resistance). Table 1 below shows the oxide ion conductivity at 500° C.

TABLE 1

| | Precursor $A_{2.00+x}TO_{5.00+z}$ | | | | | Oxide ion conductor $A_{9.33+x}[T_{6.00-y}M_y]O_{26.0+z}$ | | | | | | | | Degree of c-axis orientation | Conductivity (S/cm) @500° C. |
|---|---|---|---|---|---|---|---|---|---|---|---|---|---|---|---|
| | A | T | O | x | z | A | T | M | O | x | y | z | A/M | | |
| Ex. 1 | La 2.06 | Si 1.00 | O 5.09 | 0.06 | 0.09 | La 10.0 | Si 5.41 | B 0.59 | O 26.7 | 0.67 | 0.59 | 0.71 | 16.9 | 0.98 | $7.67 \times 10^{-2}$ |
| Ex. 2 | La 2.00 | Si 1.00 | O 5.00 | 0.00 | 0.00 | La 9.89 | Si 5.30 | B 0.70 | O 26.5 | 0.56 | 0.70 | 0.49 | 14.1 | 0.98 | $7.01 \times 10^{-2}$ |
| Ex. 3 | La 2.01 | Si 1.00 | O 5.02 | 0.01 | 0.02 | La 9.81 | Si 5.16 | B 0.84 | O 26.3 | 0.48 | 0.84 | 0.30 | 11.7 | 0.99 | $5.94 \times 10^{-2}$ |
| Ex. 4 | La 2.05 | Si 1.00 | O 5.08 | 0.05 | 0.08 | La 9.90 | Si 5.04 | B 0.96 | O 26.4 | 0.57 | 0.96 | 0.37 | 10.3 | 0.98 | $4.22 \times 10^{-2}$ |
| Com. Ex. 1 | La 2.03 | Si 1.00 | O 5.05 | 0.03 | 0.05 | La 9.93 | Si 4.68 | B 1.32 | O 26.2 | 0.60 | 1.32 | 0.24 | 7.52 | 0.96 | $3.09 \times 10^{-2}$ |

As is clear from the results shown in Table 1, it can be seen that the oriented apatite-type oxide ion conductors obtained in the examples had higher degrees of orientation and higher oxide ion conductivities compared with the oriented apatite-type oxide ion conductor obtained in the comparative example.

INDUSTRIAL APPLICABILITY

According to the present invention, an oriented apatite-type oxide ion conductor having a higher level of oxide ion conductivity than a conventional oxide ion conductor is provided.

The invention claimed is:
1. An oriented apatite-type oxide ion conductor comprising a composite oxide expressed as $A_{9.33+x}[T_{6.00-y}M_y]O_{26.0+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, and M represents one or two or more elements selected from the group consisting of B, Ge, Zn, Sn, W, and Mo, and where x is from −1.00 to 1.00, y is from 0.40 to less than 1.00, and z is from −3.00 to 2.00.

2. The oriented apatite-type oxide ion conductor as set forth in claim 1, which has a degree of orientation of 0.60 or greater as measured according to the Lotgering method.

3. An electrode assembly that has a configuration in which electrodes are stacked on two surfaces of the oriented apatite-type oxide ion conductor as set forth in claim 1.

4. A method for producing an oriented apatite-type oxide ion conductor, comprising:
a step of converting a precursor expressed as $A_{2.00+x}TO_{5.00+z}$, where A represents one or two or more elements selected from the group consisting of La, Ce, Pr, Nd, Sm, Eu, Gd, Tb, Dy, Be, Mg, Ca, Sr, and Ba, T represents an element including Si or Ge or both, x is from −1.00 to 1.00, and z is from −2.00 to 2.00, into an oriented apatite-type crystal structure by heating the precursor in a gas phase containing an element M, where M represents one or two or more elements selected from the group consisting of B, Ge, Zn, Sn, W, and Mo, and thereby reacting the element M with the precursor; and
an annealing step.

5. An electrode assembly that has a configuration in which electrodes are stacked on two surfaces of the oriented apatite-type oxide ion conductor as set forth in claim 2.

* * * * *